No. 898,211.  
PATENTED SEPT. 8, 1908.
G. FRIEDMAN.  
BREAD MIXER.  
APPLICATION FILED AUG. 2, 1907.
Fig. 1.
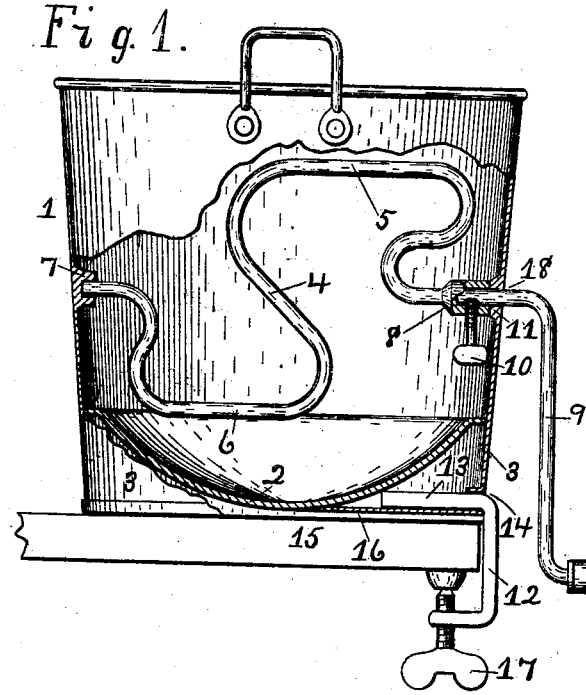
Fig. 2.
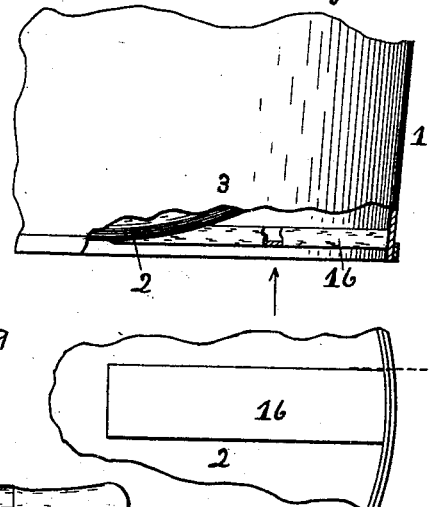
Fig. 3.
Fig. 5.
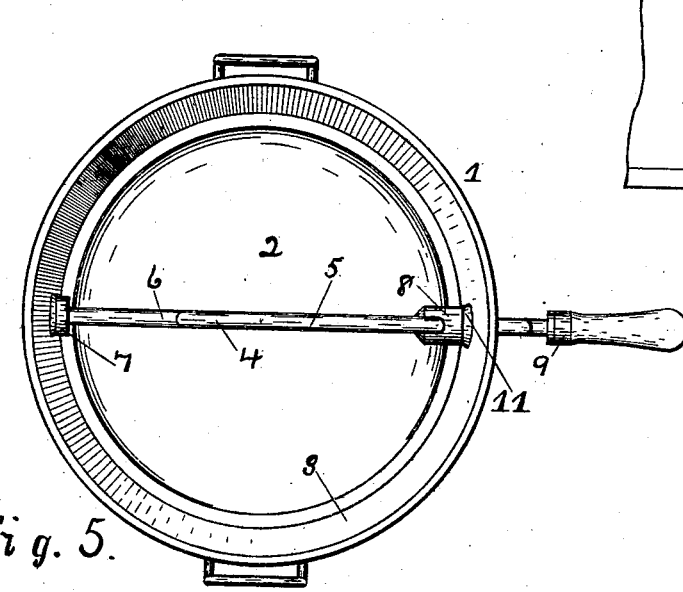
Fig. 4.
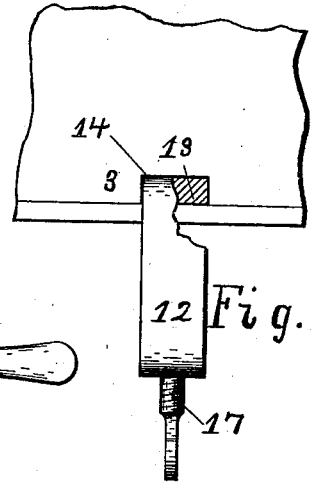
Attest:  
M. B. Smith.  
A. M. Whitmore.
Inventor:  
Goste Friedman,  
By E. B. Whitman, Atty.
THE NORRIS PETERS CO., WASHINGTON, D. C.

UNITED STATES PATENT OFFICE.

GOSTE FRIEDMAN, OF JAMESTOWN, NEW YORK.

BREAD-MIXER.

No. 898,211.  Specification of Letters Patent.  Patented Sept. 8, 1908.

Application filed August 2, 1907. Serial No. 386,790.

*To all whom it may concern:*

Be it known that I, GOSTE FRIEDMAN, of Jamestown, in the county of Chautauqua and State of New York, have invented a new and useful Improvement in Bread-Mixers, which improvement is fully set forth in the following specification and shown in the accompanying drawings.

My invention is an improved article for use in the kitchen, it being a utensil or device for use upon a table for conveniently and rapidly mixing a batch of bread dough preparatory to baking.

The invention comprises a metal, pail-shape or flaring vessel for holding the dough, and one object of the invention is to provide a curved or sinuated revoluble rod within the vessel for directly acting upon and agitating the dough. Internal bearings on opposite sides of the vessel are provided for supporting the rod the axis of which is both horizontal and diametrical, the rod being revolved, ordinarily, by means of a crank outside of the vessel. Convenient means are also provided for temporarily securing the vessel to a table.

Other objects and advantages of the invention will be brought out and made to appear in the following description, and the novel features pointed out in the appended claims, reference being had to the accompanying drawing which, with the reference characters marked thereon, forms a part of this specification.

In the drawing, Figure 1 is a side elevation of the bread-mixing device, mainly in vertical axial section, showing the inner parts. Fig. 2 is an elevation of a part at the bottom of the vessel, parts being broken away to show parts within. Fig. 3 is a view of parts at the bottom of the vessel seen as indicated by arrow in Fig. 2. Fig. 4 is a side elevation of a portion at the bottom of the vessel, showing the opening and the clamp therein, parts being broken away. Fig. 5 is a plan showing the interior of the vessel and the mixer. Figs. 2, 3 and 4 are drawn to a scale larger than that of Figs. 1 and 5.

Referring to the parts shown 1, in the drawings, is the body of the device, it being of sheet-metal and in the form of a flaring pail, open at the top and preferably formed with a concave or rounded bottom 2, the slanting sides 3 of the body extending slightly below the rounded bottom, as appears in Figs. 1 and 2.

Within the vessel is the operating member 4, it being a sinuous metal rod having a series of reverse curves alternated with straight or tangential parts in a plane, as shown in Figs. 1 and 5, there being two main portions or sections 5 and 6 extending in opposite directions from the axis of the member 4. This part 4, which constitutes the mixer for the dough, has its two end portions straight and coaxial, one resting in a journal bearing 7 projecting inwardly at one side of the vessel or body 1, the other end having a hollow expanded part or head 8.

An operating crank 9 has its extreme end passed through an opening 18 in the side of the vessel 1, diametrically opposite the bearing 7, and entering the head 8 of the mixer axially, it being held to place in the mixer by a thumb-screw 10, as clearly appears in Fig. 1. The vessel is formed with an inwardly projecting ring 11 around the opening 18, constituting a journal bearing for the crank 9 and, indirectly, for the adjacent end of the mixer 4.

The straight or tangential parts of the two main portions 5 and 6 of the mixer 4 are equally distant from, and parallel with, the axis of the mixer, they striking into the dough alternately as the mixer is revolved by the crank 9.

By passing the end of the crank 9 through the bearing ring 11 and having no journal bearing for the mixer at that end, permits of the mixer being readily and conveniently removed from the vessel at any time for cleansing or for other purposes. This manner of joining the crank and the mixer is also desirable as occasionally and in certain conditions of the dough it is desirable to rock the mixer instead of revolving it.

For securing the vessel to a table or similar support 15, while in use, a clamp 12, Figs. 1 and 4, is employed with its upper horizontal portion 13 passed into an opening 14 through the side 3 of the vessel beneath the bottom 2. Within the slant side 3 is placed horizontally and radially, a shallow open tray 16, Figs. 1, 2 and 3, rectangular in cross section, with its end opposite the opening 14, the inner end of the tray being secured to the curved bottom 2 of the vessel. When the part 13 of the clamp is passed through the opening 14 leading into the tray it enters and occupies the latter, and the clamp-screw 17 being properly turned the vessel is clamped temporarily firmly to the table 15.

What I claim as my invention and desire to secure by Letters Patent is:—

A device for mixing dough comprising a vessel for holding the dough having a concaved bottom, journal bearings integral with the inner wall of the vessel at diametrically opposite sides, a revoluble mixer within the vessel and having a series of curves and alternated tangential portions in a plane, there being oppositely disposed sections to act directly upon the dough, an operating crank having one end engaged in one of said bearings, and a thumb screw within the vessel passed through said bearing and engaging the crank for detachably connecting the crank with one end of said mixer.

In witness whereof, I have hereunto set my hand this 29th day of July, 1907, in the presence of two subscribing witnesses.

GOSTE FRIEDMAN.

Witnesses:
  A. FRIEDMAN,
  W. E. ANDRUSS.